US011321452B2

(12) United States Patent
Hua et al.

(10) Patent No.: US 11,321,452 B2
(45) Date of Patent: May 3, 2022

(54) EXECUTION ENVIRONMENT VIRTUALIZATION METHOD AND APPARATUS AND VIRTUAL EXECUTION ENVIRONMENT ACCESS METHOD AND APPARATUS

(71) Applicant: HUAWEI TECHNOLOGIES CO., LTD., Shenzhen (CN)

(72) Inventors: Zhichao Hua, Shanghai (CN); Yubin Xia, Shanghai (CN); Haibo Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 16/043,124

(22) Filed: Jul. 23, 2018

(65) Prior Publication Data
US 2018/0330081 A1 Nov. 15, 2018

Related U.S. Application Data

(63) Continuation of application No. PCT/CN2016/092025, filed on Jul. 28, 2016.

(30) Foreign Application Priority Data

Feb. 3, 2016 (CN) .......................... 201610075968.X

(51) Int. Cl.
*G06F 21/53* (2013.01)
*G06F 9/455* (2018.01)
(Continued)

(52) U.S. Cl.
CPC .......... *G06F 21/53* (2013.01); *G06F 9/45558* (2013.01); *G06F 9/5077* (2013.01);
(Continued)

(58) Field of Classification Search
CPC .... G06F 21/53; G06F 12/109; G06F 12/1441; G06F 12/1433; G06F 12/1491;
(Continued)

(56) References Cited

U.S. PATENT DOCUMENTS 7,124,170 B1 * 10/2006 Sibert ................... G06F 12/145
709/216
8,397,305 B2 3/2013 Tormasov
(Continued)

FOREIGN PATENT DOCUMENTS

| CN | 101006433 A | 7/2007 |
|---|---|---|
| CN | 101573687 A | 11/2009 |

(Continued)

*Primary Examiner* — Trong H Nguyen
*Assistant Examiner* — Hamid Talaminaei

(57) ABSTRACT

The present disclosure provides an execution environment virtualization method. The method includes: creating an ordinary virtual machine and a trusted virtual machine for a user in the ordinary execution environment, where the ordinary virtual machine executes an ordinary application of the user, and the trusted virtual machine executes a security application of the user; allocating memories to the ordinary virtual machine and the trusted virtual machine; establishing a mapping relationship between an ordinary memory of the ordinary virtual machine and a physical memory, to obtain a first memory mapping table; and establishing a mapping relationship between a virtual physical memory of the trusted virtual machine and a physical memory, to obtain a second memory mapping table. Therefore, the ordinary application and the security application run in execution environments independent of each other, thereby ensuring data security of the user.

19 Claims, 8 Drawing Sheets

(51) Int. Cl.
*G06F 9/50* (2006.01)
*G06F 12/109* (2016.01)
*G06F 12/14* (2006.01)
*G06F 9/48* (2006.01)
*G06F 21/62* (2013.01)

(52) U.S. Cl.
CPC ........ *G06F 12/109* (2013.01); *G06F 12/1433* (2013.01); *G06F 12/1441* (2013.01); *G06F 12/1491* (2013.01); *G06F 2009/45579* (2013.01); *G06F 2009/45583* (2013.01); *G06F 2009/45587* (2013.01); *G06F 2009/45595* (2013.01); *G06F 2212/1052* (2013.01); *G06F 2212/151* (2013.01); *G06F 2212/656* (2013.01); *G06F 2212/657* (2013.01)

(58) Field of Classification Search
CPC ............... G06F 9/45558; G06F 9/5077; G06F 2212/151; G06F 2009/45579; G06F 2212/656; G06F 2212/1052; G06F 2212/657; G06F 2009/45583; G06F 2009/45587; G06F 2009/45595; G06F 9/4812; G06F 12/1483; G06F 21/629; G06F 2221/2141
See application file for complete search history.

(56) References Cited

U.S. PATENT DOCUMENTS

| | | | |
|---|---|---|---|
| 9,274,974 B1* | 3/2016 | Chen | G06F 9/45558 |
| 2008/0005794 A1 | 1/2008 | Inoue et al. | |
| 2008/0222366 A1* | 9/2008 | Hieda | G06F 9/45558 711/148 |
| 2011/0293097 A1 | 12/2011 | Maino et al. | |
| 2013/0080726 A1* | 3/2013 | Kegel | G06F 21/85 711/163 |
| 2013/0103938 A1 | 4/2013 | Datta et al. | |
| 2014/0075502 A1 | 3/2014 | Aissi et al. | |
| 2015/0220745 A1 | 8/2015 | Nellitheertha et al. | |
| 2016/0364341 A1* | 12/2016 | Banginwar | G06F 9/485 |

FOREIGN PATENT DOCUMENTS

| | | |
|---|---|---|
| CN | 101599022 A | 12/2009 |
| CN | 102110196 A | 6/2011 |
| CN | 103026347 A | 4/2013 |
| CN | 103257929 A | 8/2013 |
| CN | 104169939 A | 11/2014 |
| CN | 104794395 A | 7/2015 |
| CN | 104899506 A | 9/2015 |
| EP | 2680180 A1 | 1/2014 |

* cited by examiner

EXECUTION ENVIRONMENT VIRTUALIZATION METHOD AND APPARATUS AND VIRTUAL EXECUTION ENVIRONMENT ACCESS METHOD AND APPARATUS

CROSS-REFERENCE TO RELATED APPLICATIONS

This application is a continuation of International Application No. PCT/CN2016/092025, filed on Jul. 28, 2016, which claims priority to Chinese Patent Application No. 201610075968.X, filed on Feb. 3, 2016. The disclosures of the aforementioned applications are hereby incorporated by reference in their entireties.

TECHNICAL FIELD

The present invention relates to the field of virtualization technologies, and specifically, to an execution environment virtualization method and apparatus and a virtual execution environment access method and apparatus.

BACKGROUND

With increasing popularity of mobile terminals, more and more data closely related to user privacy is stored in the mobile terminals, and more attention is paid to security of the mobile terminals. An existing mainstream security solution is to use a trusted execution environment provided by hardware to isolate a security application from an ordinary application run in a mobile terminal. In other words, the security application runs in the trusted execution environment provided by the hardware of the mobile terminal, and the ordinary application runs in an ordinary execution environment provided by the hardware of the mobile terminal. The isolation at a hardware level can effectively protect the security application in the trusted execution environment from being "disturbed" by a malicious application.

As performance of the mobile terminal is improved, a virtualization system in the mobile terminal becomes more mature. However, the trusted execution environment provided by the hardware of the mobile terminal does not adapt to the more improved virtualization system. Actually, the hardware of the mobile terminal provides only one trusted execution environment, but a plurality of virtual machines may be configured in the mobile terminal. Therefore, all virtual machine users in the mobile terminal need to share a same trusted execution environment. In other words, security applications of all the virtual machine users need to run in a same trusted execution environment. Apparently, an essential function of the trusted execution environment of providing a secure execution environment for the security applications is completely lost. Once a malicious virtual machine user exists in the mobile terminal, the malicious virtual machine user can easily steal private data of another virtual machine user through the shared trusted execution environment.

Therefore, how to provide a secure independent trusted execution environment for each virtual machine user in the virtualization system of the mobile terminal has been a problem urgently to be resolved.

SUMMARY

The present invention provides an execution environment virtualization method, to provide a secure independent trusted execution environment for each virtual machine user, and ensure data security of the user.

To resolve the foregoing technical problem, a first aspect of the present invention provides an execution environment virtualization method. The method is applied to a mobile terminal. The mobile terminal has an ordinary execution environment provided by hardware. A virtual machine monitor in the mobile terminal creates an ordinary virtual machine and a trusted virtual machine for a user in the ordinary execution environment. The ordinary virtual machine executes an ordinary application of the user, and the trusted virtual machine executes a security application of the user. In addition, the virtual machine monitor allocates virtual physical memories having a same size to the ordinary virtual machine and the trusted virtual machine, where the virtual physical memory of the ordinary virtual machine includes an ordinary memory and a secure memory, the virtual physical memory of the trusted virtual machine includes an ordinary memory and a secure memory, and the ordinary memory of the ordinary virtual machine and the ordinary memory of the trusted virtual machine have a same size; establishes a mapping relationship between the ordinary memory of the ordinary virtual machine and a physical memory, and stores the mapping relationship between the ordinary memory of the ordinary virtual machine and the physical memory in a first memory mapping table, so that the ordinary virtual machine accesses the ordinary memory of the ordinary virtual machine based on the first memory mapping table; and establishes a mapping relationship between the virtual physical memory of the trusted virtual machine and a physical memory, and stores the mapping relationship between the virtual physical memory of the trusted virtual machine and the physical memory in a second memory mapping table, so that the trusted virtual machine accesses the secure memory and the ordinary memory of the trusted virtual machine based on the second memory mapping table, where the physical memory mapped to the ordinary memory of the trusted virtual machine is the same as the physical memory mapped to the ordinary memory of the ordinary virtual machine.

With reference to the first aspect, optionally, in the present invention, the ordinary virtual machine and the trusted virtual machine are used to respectively simulate, for the user, the ordinary execution environment and a trusted execution environment provided by the hardware of the mobile terminal, so that the ordinary application and the security application of the user can respectively run on the ordinary virtual machine and the trusted virtual machine, thereby isolating the execution environments of the security application and the ordinary application, and ensuring data security of the user. In addition, in the present invention, memories are further allocated to the ordinary virtual machine and the trusted virtual machine of the user by simulating memory access statuses of the execution environments provided by the hardware of the mobile terminal, and the first memory mapping table and the second memory mapping table are generated. The ordinary virtual machine and the trusted virtual machine of the user can access the physical memories corresponding to the ordinary memories. However, the ordinary virtual machine cannot access a physical memory corresponding to the secure memory of the trusted virtual machine, thereby isolating the applications running on the trusted virtual machine and the ordinary virtual machine.

With reference to the first aspect, it should be noted that in the execution environment virtualization method provided in the present invention, a device access permission table and an interrupt processing permission table are further created and maintained for the user. The device access permission table stores devices that can be accessed by the ordinary virtual machine and the trusted virtual machine of the user, and the interrupt processing permission table stores interrupt types that the ordinary virtual machine and the trusted virtual machine of the user are responsible for processing.

A device access permission table and an interrupt processing permission table are created and maintained for each user, so that devices that can be accessed by an ordinary virtual machine and a trusted virtual machine of each user and interrupt types that the ordinary virtual machine and the trusted virtual machine of the user are responsible for processing are preset.

With reference to the first aspect, in the execution environment virtualization method provided in the present invention, an authorized modification condition of the first memory mapping table, an authorized modification condition of the second memory mapping table, an authorized modification condition of the device access permission table, an authorized modification condition of the interrupt processing permission table, and an authorized modification condition of a page table of the virtual machine monitor are stored into a security module. The security module is located in the trusted execution environment provided by the hardware of the mobile terminal, and the trusted virtual machine can operate the security module.

In the execution environment virtualization method provided in the present invention, each of the authorized modification condition of the first memory mapping table, the authorized modification condition of the second memory mapping table, the authorized modification condition of the device access permission table, and the authorized modification condition of the interrupt processing permission table that are stored into the security module may include that the virtual machine sending the modification request is a trusted virtual machine. In addition, the authorized modification condition further includes that the modification request sent by the virtual machine is a modification for the first memory mapping table, the second memory mapping table, the device access permission table, or the interrupt processing permission table of the user possessing the virtual machine.

In the present invention, the authorized modification condition of the first memory mapping table, the authorized modification condition of the second memory mapping table, the authorized modification condition of the device access permission table, the authorized modification condition of the interrupt processing permission table, and the authorized modification condition of the page table of the virtual machine monitor are stored into the security module provided by the hardware disposed in the mobile terminal, so that validity of the modification request is verified and data of the user is prevented from being maliciously modified, further ensuring the data security of the user.

A second aspect of the present invention provides a virtual execution environment access method. The method is applied to a mobile terminal. The mobile terminal has an ordinary execution environment provided by hardware. Two virtual machines, an ordinary virtual machine and a trusted virtual machine, associated with a preset user run in the ordinary execution environment. The ordinary virtual machine executes an ordinary application of the user, and the trusted virtual machine executes a security application of the user. A virtual machine monitor of the mobile terminal intercepts an environment switching instruction executed by the user in the ordinary virtual machine or the trusted virtual machine; determines, based on the environment switching instruction, a target virtual machine that the user is to switch to; stores execution status information of a virtual machine currently used by the user; and reads and restores execution status information of the target virtual machine.

With reference to the second aspect, it should be noted that in the present invention, a trusted virtual machine and an ordinary virtual machine of each user simulate a process of switching an execution environment between a trusted execution environment and an ordinary execution environment provided by the hardware of the mobile terminal, thereby providing the execution environments independent of each other for the security application and the ordinary application of the user, and ensuring security of data information.

With reference to the second aspect, in the virtual execution environment access method provided in the present invention, after intercepting the environment switching instruction, the virtual machine monitor queries the two virtual machines associated with the user, where one is the currently used virtual machine, and the other is the target virtual machine that the user is to switch to.

In the virtual execution environment access method provided in the present invention, the virtual machine monitor receives a memory access request from the ordinary virtual machine, where the memory access request carries a virtual physical memory; queries, in a preset first memory mapping table, a real physical memory having a mapping relationship with the virtual physical memory; and completes the memory access request if the real physical memory is found; otherwise, indicates an access exception.

The virtual machine monitor receives a memory access request from the trusted virtual machine, where the memory access request carries a virtual physical memory; queries, in a preset second memory mapping table, a real physical memory having a mapping relationship with the virtual physical memory; and completes the memory access request if the real physical memory is found; otherwise, indicates an access exception.

The virtual machine monitor receives a device access request from any virtual machine, where the device access request carries a device identifier; queries, in a preset device access permission table, whether the virtual machine can access a device corresponding to the device identifier; and completes the device access request if the virtual machine can access the device corresponding to the device identifier; otherwise, indicates an access exception.

The virtual machine monitor receives any interrupt processing request, where the interrupt processing request carries an interrupt type; queries, in a preset interrupt processing permission table, a virtual machine responsible for processing the interrupt type; and allocates the interrupt processing request to the virtual machine for processing.

With reference to the second aspect, optionally, the mobile terminal in the present invention further has the trusted execution environment provided by the hardware, and a security module is provided in the trusted execution environment. The virtual machine monitor receives a modification request from any virtual machine, where the modification request is a modification request for the preset first memory mapping table, second memory mapping table, device access permission table, or interrupt processing permission table, or a page table of the virtual machine monitor; and forwards the modification request to the security module located in the trusted execution environment. The security module is configured to determine whether the modification request satisfies an authorized modification condition of the first memory mapping table, an authorized modification condition of the second memory mapping table, an authorized modification condition of the device access permission table, an authorized modification condition of the interrupt processing permission table, or an authorized modification condition of the page table of the virtual machine monitor, and accepts the modification request when determining that the modification request satisfies any authorized modification condition. The authorized modification condition includes that the virtual machine sending the modification request is a trusted virtual machine.

In the virtual execution environment access method provided in the second aspect of the present invention, the security module is provided in the trusted execution environment provided by the hardware of the mobile terminal, to further ensure data security of the user. The security module is configured to determine validity of the modification request, to prevent an unauthorized modification on the data information of the user by a malicious program, thereby ensuring the data security of the user.

A third aspect of the present invention provides an execution environment virtualization apparatus. The apparatus is applied to a mobile terminal. The mobile terminal has an ordinary execution environment provided by hardware. The apparatus includes: a first creation module, configured to create an ordinary virtual machine and a trusted virtual machine for a user in the ordinary execution environment, where the ordinary virtual machine executes an ordinary application of the user, and the trusted virtual machine executes a security application of the user; an allocation module, configured to allocate virtual physical memories having a same size to the ordinary virtual machine and the trusted virtual machine, where the virtual physical memory of the ordinary virtual machine includes an ordinary memory and a secure memory, the virtual physical memory of the trusted virtual machine includes an ordinary memory and a secure memory, and the ordinary memory of the ordinary virtual machine and the ordinary memory of the trusted virtual machine have a same size; a second establishment module, configured to: establish a mapping relationship between the ordinary memory of the ordinary virtual machine and a physical memory, and store the mapping relationship between the ordinary memory of the ordinary virtual machine and the physical memory in a first memory mapping table, so that the ordinary virtual machine accesses the ordinary memory of the ordinary virtual machine based on the first memory mapping table; and a third establishment module, configured to: establish a mapping relationship between the virtual physical memory of the trusted virtual machine and a physical memory, and store the mapping relationship between the virtual physical memory of the trusted virtual machine and the physical memory in a second memory mapping table, so that the trusted virtual machine accesses the secure memory and the ordinary memory of the trusted virtual machine based on the second memory mapping table, where the physical memory mapped to the ordinary memory of the trusted virtual machine is the same as the physical memory mapped to the ordinary memory of the ordinary virtual machine.

The execution environment virtualization apparatus provided in the third aspect of the present invention uses the trusted virtual machine and the ordinary virtual machine to simulate a trusted execution environment and the ordinary execution environment provided by the hardware of the mobile terminal, thereby providing isolated execution environments for a security application and an ordinary application of a virtual machine user, and ensuring data security of the security application.

With reference to the third aspect, the execution environment virtualization apparatus provided in the present invention further includes a fourth creation module, configured to create and maintain a device access permission table and an interrupt processing permission table for the user. The device access permission table stores devices that can be accessed by the ordinary virtual machine and the trusted virtual machine of the user, and the interrupt processing permission table stores interrupt types that the ordinary virtual machine and the trusted virtual machine of the user are responsible for processing.

The mobile terminal in the present invention has the trusted execution environment provided by the hardware, and a security module is provided in the trusted execution environment. The execution environment virtualization apparatus provided in the present invention further includes a storage module, configured to store an authorized modification condition of the first memory mapping table, an authorized modification condition of the second memory mapping table, an authorized modification condition of the device access permission table, an authorized modification condition of the interrupt processing permission table, and an authorized modification condition of a page table of a virtual machine monitor into the security module. The security module is located in the trusted execution environment, and the trusted virtual machine can operate the security module.

A fourth aspect of the present invention provides a virtual execution environment access apparatus. The apparatus is applied to a mobile terminal. The mobile terminal has an ordinary execution environment provided by hardware. Two virtual machines, an ordinary virtual machine and a trusted virtual machine, associated with a preset user run in the ordinary execution environment. The ordinary virtual machine executes an ordinary application of the user, and the trusted virtual machine executes a security application of the user. The apparatus includes: an interception module, configured to intercept an environment switching instruction executed by the user in the ordinary virtual machine or the trusted virtual machine; a determining module, configured to determine, based on the environment switching instruction, a target virtual machine that the user is to switch to; a storing module, configured to store execution status information of a virtual machine currently used by the user; and a reading module, configured to read and restore execution status information of the target virtual machine.

The virtual execution environment access apparatus provided in the fourth aspect of the present invention simulates, for the trusted virtual machine and the ordinary virtual machine of the user, a process of switching an execution environment between the trusted execution environment and the ordinary execution environment provided by the hardware of the mobile terminal, thereby providing the execution environments independent of each other for the security application and the ordinary application of the user, and ensuring security of data information of the user.

The determining module in the virtual execution environment access apparatus provided in the fourth aspect of the present invention is specifically configured to query, after the environment switching instruction is intercepted, the two virtual machines associated with the user, where one is the currently used virtual machine, and the other is the target virtual machine that the user is to switch to.

With reference to the fourth aspect, optionally, the virtual execution environment access apparatus provided in the present invention further includes: a first receiving module, configured to receive a memory access request from the ordinary virtual machine, where the memory access request carries a virtual physical memory; and a first query module, configured to: query, in a preset first memory mapping table, a real physical memory having a mapping relationship with the virtual physical memory; and complete the memory access request if the real physical memory is found; otherwise, indicate an access exception.

With reference to the fourth aspect, it should be noted that, the virtual execution environment access apparatus provided in the present invention further includes: a second receiving module, configured to receive a memory access request from the trusted virtual machine, where the memory access request carries a virtual physical memory; and a second query module, configured to: query, in a preset second memory mapping table, a real physical memory having a mapping relationship with the virtual physical memory; and complete the memory access request if the real physical memory is found; otherwise, indicate an access exception.

The virtual execution environment access apparatus provided in the present invention further includes: a third receiving module, configured to receive an access request from any virtual machine, where the access request carries a device identifier; and a third query module, configured to: query, in a preset device access permission table, whether the virtual machine can access a device corresponding to the device identifier; and complete the access request if the virtual machine can access the device corresponding to the device identifier; otherwise, indicate an access exception.

The virtual execution environment access apparatus provided in the present invention further includes: a fourth receiving module, configured to receive any interrupt processing request, where the interrupt processing request carries an interrupt type; and a fourth query module, configured to: query, in a preset interrupt processing permission table, a virtual machine responsible for processing the interrupt type; and allocate the interrupt processing request to the virtual machine for processing.

The mobile terminal in the present invention has the trusted execution environment provided by the hardware, and a security module is provided in the trusted execution environment. The virtual execution environment access apparatus provided in the present invention further includes: a fifth receiving module, configured to receive a modification request from any virtual machine, where the modification request is a modification request for the preset first memory mapping table, second memory mapping table, device access permission table, or interrupt processing permission table, or a page table of a virtual machine monitor; and a forwarding module, configured to forward the modification request to the security module located in the trusted execution environment. The security module is configured to determine whether the modification request satisfies an authorized modification condition of the first memory mapping table, an authorized modification condition of the second memory mapping table, an authorized modification condition of the device access permission table, an authorized modification condition of the interrupt processing permission table, or an authorized modification condition of the page table of the virtual machine monitor, and accepts the modification request when determining that the modification request satisfies any authorized modification condition. The authorized modification condition includes that the virtual machine sending the modification request is a trusted virtual machine.

In the virtual execution environment access apparatus provided in the present invention, each of the authorized modification condition of the first memory mapping table, the authorized modification condition of the second memory mapping table, the authorized modification condition of the device access permission table, and the authorized modification condition of the interrupt processing permission table may include that the virtual machine sending the modification request is a trusted virtual machine. In addition, the authorized modification condition further includes that the modification request sent by the virtual machine is a modification for the first memory mapping table, the second memory mapping table, the device access permission table, or the interrupt processing permission table of the user possessing the virtual machine.

In the virtual execution environment access apparatus provided in the present invention, the security module provided in the trusted execution environment determines validity of the modification request, to prevent an unauthorized modification on the data information of the user by a malicious program, thereby ensuring the data security of the user.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To enable persons skilled in the art to better understand the solutions in the embodiments of the present invention, the following describes the embodiments of the present invention in more detail with reference to accompanying drawings and implementations.

A mobile terminal has a trusted execution environment and an ordinary execution environment provided by hardware. To ensure data security of a security application of a user, a security application requiring relatively high data security separately runs in the trusted execution environment, and an ordinary application runs in the ordinary execution environment isolated from the trusted execution environment. However, because currently, the hardware of the mobile terminal can provide only one trusted execution environment for a plurality of configured virtual machines, all virtual machine users in the mobile terminal need to share a same trusted execution environment to run security applications of the virtual machine users. In this case, an essential function of the trusted execution environment of providing a secure execution environment for the security applications is completely lost. Once a malicious virtual machine user exists in the mobile terminal, the malicious virtual machine user can easily steal private data of another virtual machine user through the shared trusted execution environment.

Figure 1:
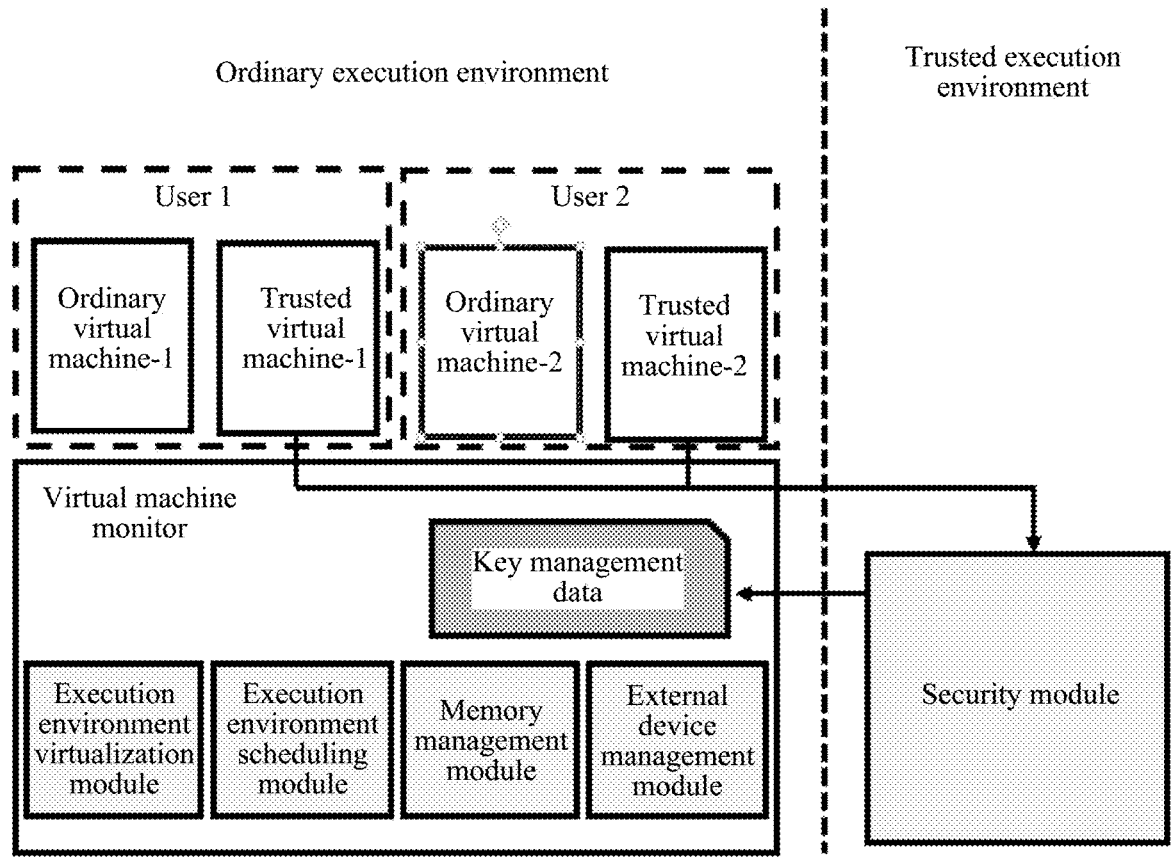
FIG. 1 is a schematic architectural diagram of execution environment virtualization according to an embodiment of the present invention.

As shown in FIG. 1, FIG. 1 is a schematic architectural diagram of execution environment virtualization according to an embodiment of the present invention. An execution environment virtualization method provided in the present invention is applied to a mobile terminal, for example, a smartphone or a tablet computer. The mobile terminal has an ordinary execution environment and a trusted execution environment provided by hardware. In the present invention, two virtual machines are used to respectively simulate, for each virtual machine user in the mobile terminal, the trusted execution environment and the ordinary execution environment provided by the hardware. The two virtual machines are a trusted virtual machine and an ordinary virtual machine. As shown in FIG. 1, an ordinary virtual machine-1 and a trusted virtual machine-1 are configured for a user 1, and an ordinary virtual machine-2 and a trusted virtual machine-2 are configured for a user 2. Each virtual machine user has an independent trusted virtual machine for executing a security application of the virtual machine user. Therefore, in the present invention, execution environments of security applications of virtual machine users can be isolated from each other, thereby avoiding threats caused by a malicious virtual machine user by stealing private data of another virtual machine user through a shared trusted execution environment.

In addition, a virtual machine monitor runs in the ordinary execution environment of the mobile terminal. The virtual machine monitor includes an execution environment virtualization module, an execution environment scheduling module, a memory management module, and an external device management module. The execution environment virtualization module is configured to: create an ordinary virtual machine and a trusted virtual machine for each virtual machine user of the mobile terminal, and maintain and manage the ordinary virtual machine and the trusted virtual machine, specifically including: initializing the ordinary virtual machine and the trusted virtual machine, maintaining system statuses of the ordinary virtual machine and the trusted virtual machine, and ensuring an association relationship between the ordinary virtual machine and the trusted virtual machine.

The execution environment scheduling module is configured to: intercept, through trapping, an environment switching instruction executed by the user in the ordinary virtual machine or the trusted virtual machine; query association relationships among the user, the ordinary virtual machine, and the trusted virtual machine maintained by the execution environment virtualization module, to determine a target virtual machine that the user is to switch to; and switch an execution environment. Specifically, execution status information of a virtual machine currently used by the user is stored, and execution status information of the target virtual machine is read and restored. To ensure that a virtual machine switched by the execution environment scheduling module can be executed again only when the user executes the environment switching instruction again, the execution environment scheduling module marks the switched virtual machine, so that the execution environment scheduling module does not select the marked virtual machine when the execution environment is switched.

Figure 2:
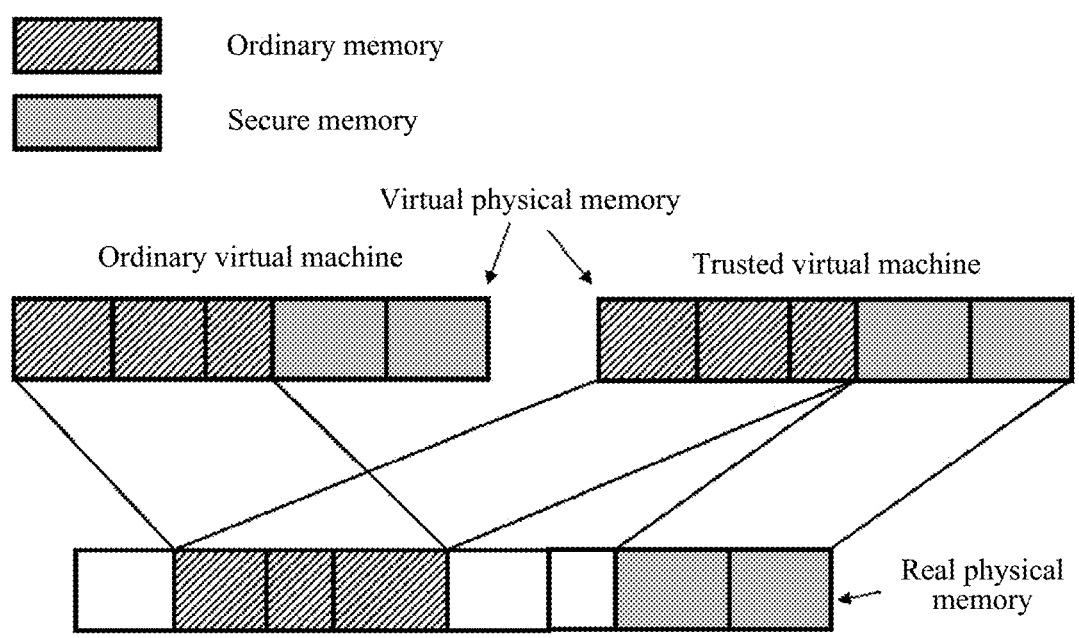
FIG. 2 is a schematic diagram of allocating memories to an ordinary virtual machine and a trusted virtual machine of a virtual machine user according to an embodiment of the present invention.

In the present invention, memories are allocated to a trusted virtual machine and an ordinary virtual machine of each user by simulating memory allocation statuses of the trusted execution environment and the ordinary execution environment provided by the hardware of the mobile terminal. Specifically, memories are allocated to a trusted virtual machine and an ordinary virtual machine of each virtual machine user by using the memory management module. As shown in FIG. 2, FIG. 2 is a schematic diagram of allocating memories to an ordinary virtual machine and a trusted virtual machine of a virtual machine user according to an embodiment of the present invention. The memory management module allocates virtual physical memories having a same size to an ordinary virtual machine and a trusted virtual machine of a same user. The virtual physical memory of the ordinary virtual machine includes an ordinary memory and a secure memory, the virtual physical memory of the trusted virtual machine includes an ordinary memory and a secure memory, and the ordinary memory of the ordinary virtual machine and the ordinary memory of the trusted virtual machine have a same size. The memory management module establishes a mapping relationship between the ordinary memory of the ordinary virtual machine and a physical memory and a mapping relationship between the virtual physical memory of the trusted virtual machine and a physical memory, stores the mapping relationship between the ordinary memory of the ordinary virtual machine and the physical memory in a first memory mapping table, and stores the mapping relationship between the virtual physical memory of the trusted virtual machine and the physical memory in a second memory mapping table, so that the ordinary virtual machine can only access the ordinary memory of the ordinary virtual machine, and the trusted virtual machine can access both the virtual physical memories. In addition, to make an ordinary virtual machine and a trusted virtual machine of a same user share one ordinary memory, ordinary memories of the two virtual machines are mapped to a same real physical memory.

The external device management module is configured to create and maintain a device access permission table and an interrupt processing permission table for each virtual machine user. The device access permission table stores devices that can be accessed by the ordinary virtual machine and the trusted virtual machine of the user, and the interrupt processing permission table stores interrupt types that the ordinary virtual machine and the trusted virtual machine of the user are responsible for processing. When receiving a device access request sent by a virtual machine of the user, the external device management module queries, in the device access permission table, whether the virtual machine can access the device; and completes the device access request if determining that the virtual machine can access the device; otherwise, indicates an access exception. In addition, when receiving an interrupt processing request sent by the virtual machine of the user, the external device management module queries, in the interrupt processing permission table, a virtual machine responsible for processing the interrupt type, and allocates the interrupt processing request to the virtual machine for processing.

The hardware of the mobile terminal in the present invention provides the trusted execution environment. A security module is provided in the trusted execution environment, and the security module may be implemented by a processor in a TrustZone hardware architecture. Isolation is provided by using the hardware of the mobile terminal. In this way, the security module separately running in the trusted execution environment is not easily damaged by a malicious program. In addition, the first memory mapping table and the second memory mapping table maintained by the memory management module and the device access permission table and the interrupt processing permission table maintained by the external device management module are stored into the virtual machine monitor as key management data. The security module pre-stores an authorized modification condition of each piece of key management data, and the security module completes validity verification on any modification request for the key management data. Specifically, the authorized modification condition includes that a virtual machine sending the modification request is to be a trusted virtual machine. The virtual machine monitor can complete the modification request only after the security module is configured to determine that the modification request is valid. In other words, the key management data stored into the virtual machine monitor is a read-only format for a program in the ordinary execution environment, and cannot be directly modified.

In addition, to prevent a malicious program from bypassing a validity verification step performed by the security module in a manner of modifying code in the virtual machine monitor, in the present invention, a page table of the virtual machine monitor is also marked as key management data, and the page table of the virtual machine monitor can be modified only after validity verification performed by the security module succeeds. The page table of the virtual machine monitor includes a mapping relationship between a virtual address of the virtual machine monitor and a real physical address. In the method, the code in the virtual machine monitor can be effectively prevented from being tampered with, further ensuring the data security of the user.

Figure 3:
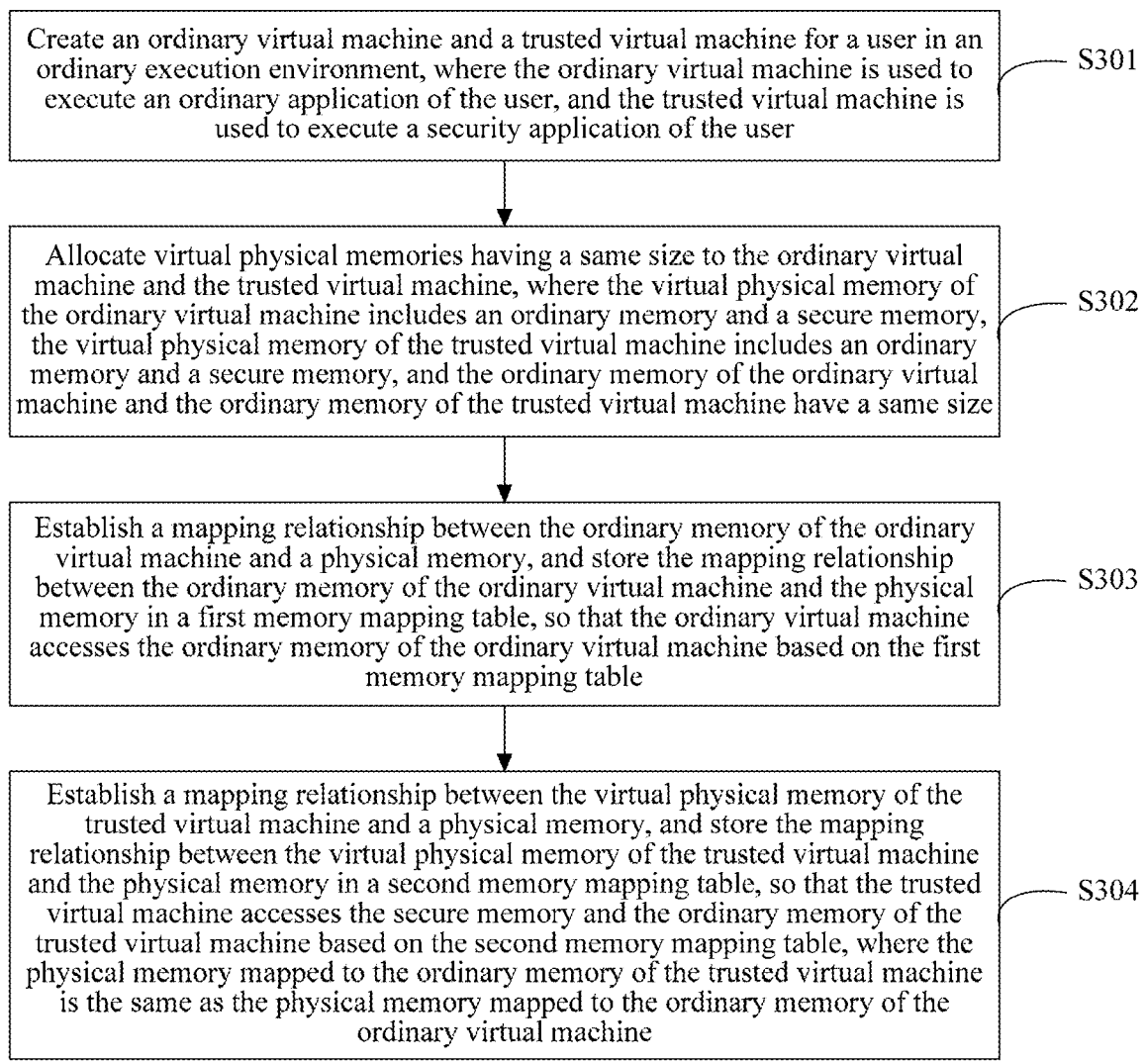
FIG. 3 is a flowchart of an execution environment virtualization method according to an embodiment of the present invention.

An embodiment of the present invention provides an execution environment virtualization method. Referring to FIG. 3, FIG. 3 is a flowchart of the execution environment virtualization method according to this embodiment of the present invention. The method includes the following steps.

S301: Create an ordinary virtual machine and a trusted virtual machine for a user in the ordinary execution environment, where the ordinary virtual machine executes an ordinary application of the user, and the trusted virtual machine executes a security application of the user.

The execution environment virtualization method provided in this embodiment of the present invention is applied to a mobile terminal. The mobile terminal has an ordinary execution environment and a trusted execution environment provided by hardware. The method provided in this embodiment of the present invention is a method for virtualizing the ordinary execution environment and the trusted execution environment.

In this embodiment of the present invention, two virtual machines (the ordinary virtual machine and the trusted virtual machine) are used to simulate an ordinary execution environment and a trusted execution environment for a virtual machine user. An ordinary application of the virtual machine user is executed in the ordinary virtual machine, and a security application of the virtual machine user is executed in the trusted virtual machine, thereby isolating the security application from the ordinary application of the user. Specifically, the security application is an application requiring relatively high data security, for example, an application related to a transaction or payment.

S302: Allocate virtual physical memories having a same size to the ordinary virtual machine and the trusted virtual machine, where the virtual physical memory of the ordinary virtual machine includes an ordinary memory and a secure memory, the virtual physical memory of the trusted virtual machine includes an ordinary memory and a secure memory, and the ordinary memory of the ordinary virtual machine and the ordinary memory of the trusted virtual machine have a same size.

Based on a memory allocation feature of the trusted execution environment and the ordinary execution environment provided by the hardware of the mobile terminal, in this embodiment of the present invention, the virtual physical memories having a same size are allocated to the ordinary virtual machine and the trusted virtual machine of the user. In addition, the ordinary memory of the ordinary virtual machine and the ordinary memory of the trusted virtual machine have a same size.

S303: Establish a mapping relationship between the ordinary memory of the ordinary virtual machine and a physical memory, and store the mapping relationship between the ordinary memory of the ordinary virtual machine and the physical memory in a first memory mapping table, so that the ordinary virtual machine accesses the ordinary memory of the ordinary virtual machine based on the first memory mapping table.

S304: Establish a mapping relationship between the virtual physical memory of the trusted virtual machine and a physical memory, and store the mapping relationship between the virtual physical memory of the trusted virtual machine and the physical memory in a second memory mapping table, so that the trusted virtual machine accesses the secure memory and the ordinary memory of the trusted virtual machine based on the second memory mapping table, where the physical memory mapped to the ordinary memory of the trusted virtual machine is the same as the physical memory mapped to the ordinary memory of the ordinary virtual machine.

Only a virtual physical memory mapped to a real physical memory can be normally accessed; otherwise, an access exception occurs. Therefore, in this embodiment of the present invention, the virtual physical memory of the trusted virtual machine is mapped to a real physical memory, so that the trusted virtual machine can access the ordinary memory and the secure memory of the trusted virtual machine. In addition, in this embodiment of the present invention, the ordinary memory of the ordinary virtual machine is mapped to a real physical memory, and the secure memory is not mapped to the real physical memory. In this way, the ordinary virtual machine can only access the ordinary memory of the ordinary virtual machine, and an access exception occurs when the secure memory of the ordinary virtual machine is accessed. In addition, a trusted virtual machine and an ordinary virtual machine of a user have an association relationship. Therefore, in a memory allocation process, a virtual machine monitor maps the ordinary memory of the ordinary virtual machine and the ordinary memory of the trusted virtual machine to a same real physical memory, thereby establishing an association relationship between the trusted virtual machine and the ordinary virtual machine of the user in terms of memories.

In this embodiment of the present invention, when the mapping relationship between the ordinary memory of the ordinary virtual machine and the physical memory is established, the first memory mapping table is generated. The first memory mapping table stores the mapping relationship between the ordinary memory of the ordinary virtual machine and the physical memory. When the mapping relationship between the virtual physical memory of the trusted virtual machine and the physical memory is established, the second memory mapping table is generated. The second memory mapping table stores the mapping relationship between the virtual physical memory of the trusted virtual machine and the physical memory.

In the execution environment virtualization method provided in this embodiment of the present invention, a device access permission table and an interrupt processing permission table are created and maintained for each user. The device access permission table stores devices that can be accessed by the ordinary virtual machine and the trusted virtual machine of the user, and the interrupt processing task table stores interrupt types that the ordinary virtual machine and the trusted virtual machine of the user are responsible for processing.

In addition, to improve security of data information in the mobile terminal, the first memory mapping table, the second memory mapping table, the device access permission table, and the interrupt processing permission table in this embodiment of the present invention are a read-only format for a program in the ordinary execution environment, that is, cannot be directly modified by the program in the ordinary execution environment.

In this embodiment of the present invention, a security module is provided in the trusted execution environment provided by the hardware of the mobile terminal, and an authorized modification condition of the first memory mapping table, an authorized modification condition of the second memory mapping table, an authorized modification condition of the device access permission table, and an authorized modification condition of the interrupt processing permission table are stored into the security module.

In addition, to prevent the virtual machine monitor in the mobile terminal from being tampered with by a malicious program, a page table of the virtual machine monitor is also set to a read-only format for the program in the ordinary execution environment. In addition, an authorized modification condition of the page table of the virtual machine monitor is also stored into the security module.

In the execution environment virtualization method provided in this embodiment of the present invention, the trusted virtual machine and the ordinary virtual machine are used to simulate the trusted execution environment and the ordinary execution environment provided by the hardware of the mobile terminal, thereby providing the isolated execution environments for the security application and the ordinary application of the virtual machine user, and ensuring data security of the security application.

Figure 4:
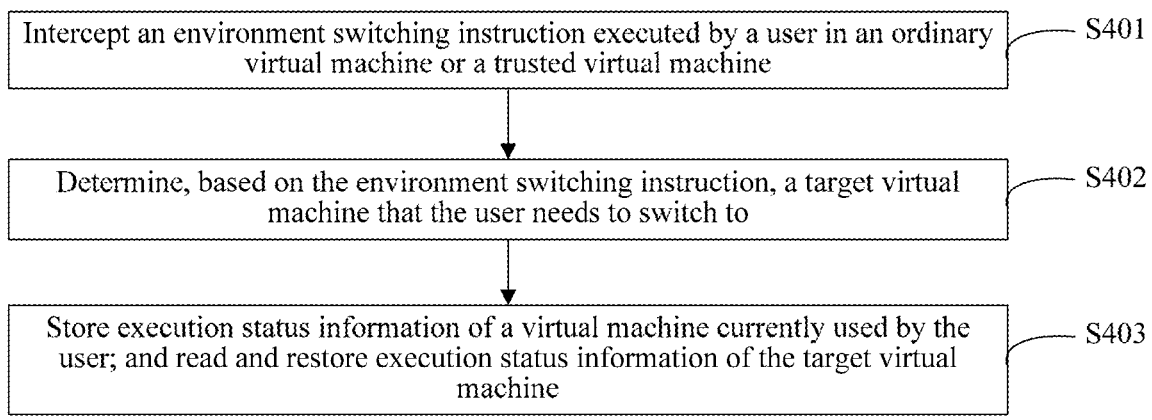
FIG. 4 is a flowchart of a virtual execution environment access method according to an embodiment of the present invention.

An embodiment of the present invention further provides a virtual execution environment access method. Referring to FIG. 4, FIG. 4 is a flowchart of the virtual execution environment access method according to this embodiment of the present invention. The method includes the following steps.

S401: Intercept an environment switching instruction executed by a user in an ordinary virtual machine or a trusted virtual machine.

S402: Determine, based on the environment switching instruction, a target virtual machine that the user is to switch to.

S403: Store execution status information of a virtual machine currently used by the user; and read and restore execution status information of the target virtual machine.

In this embodiment of the present invention, after an execution environment provided by hardware of a mobile terminal is virtualized, the virtualized execution environment is accessed.

In an actual application, a virtual machine user has an ordinary virtual machine and a trusted virtual machine. When the user triggers an environment switching instruction in a currently used virtual machine, a virtual machine monitor of the mobile terminal intercepts the environment switching instruction executed by the user, and switches an execution environment.

An ordinary virtual machine and a trusted virtual machine of a user have an association relationship. Therefore, after the environment switching instruction is intercepted, a virtual machine having an association relationship with the virtual machine currently used by the user is queried, and the virtual machine is used as the target virtual machine that the user is to switch to.

Specifically, in the process of switching an execution environment, the virtual machine monitor stores the execution status information of the virtual machine currently used by the user, to be used subsequently during a restart, and the execution status information of the target virtual machine is read and restored. Specifically, before the environment switching instruction is executed, the virtual machine used by the user temporarily stops running, until the user executes the environment switching instruction again.

This embodiment of the present invention further provides a method for accessing a first memory mapping table, a second memory mapping table, a device access permission table, and an interrupt processing permission table in a virtual execution environment.

Figure 5:
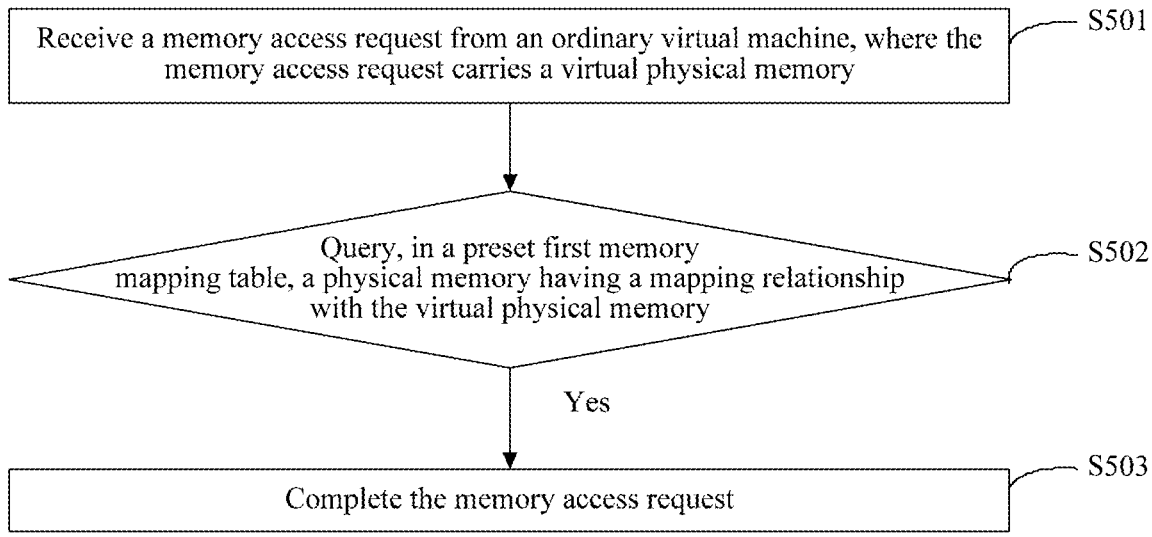
FIG. 5 is a flowchart of a method for accessing a first memory mapping table in a virtual execution environment according to an embodiment of the present invention.

Referring to FIG. 5, FIG. 5 is a flowchart of a method for accessing a first memory mapping table in a virtual execution environment according to an embodiment of the present invention. The method includes the following steps.

S501: Receive a memory access request from the ordinary virtual machine, where the memory access request carries a virtual physical memory.

S502: Query, in a preset first memory mapping table, a physical memory having a mapping relationship with the virtual physical memory; and perform S503 if the physical memory is found.

S503: Complete the memory access request.

In this embodiment of the present invention, after receiving the memory access request from the ordinary virtual machine, a virtual machine monitor of a mobile terminal queries, in the preset first memory mapping table, a real physical memory having a mapping relationship with the virtual physical memory, and completes the memory access request, that is, returns the physical memory to the ordinary virtual machine, if finding that the physical memory having the mapping relationship with the virtual physical memory exists, so that the ordinary virtual machine can access the physical memory; or indicates an access exception if finding that no physical memory having the mapping relationship with the virtual physical memory exists.

Figure 6:
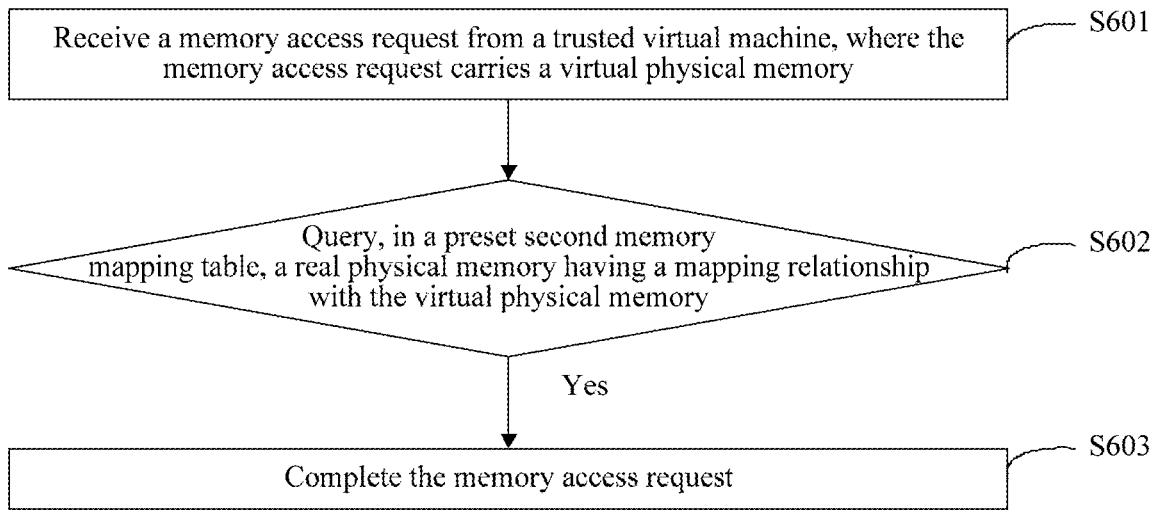
FIG. 6 is a flowchart of a method for accessing a second memory mapping table in a virtual execution environment according to an embodiment of the present invention.

Referring to FIG. 6, FIG. 6 is a flowchart of a method for accessing a second memory mapping table in a virtual execution environment according to an embodiment of the present invention. The method includes the following steps.

S601: Receive a memory access request from the trusted virtual machine, where the memory access request carries a virtual physical memory.

S602: Query, in a preset second memory mapping table, a real physical memory having a mapping relationship with the virtual physical memory; and perform S603 if the real physical memory is found.

S603: Complete the memory access request.

In this embodiment of the present invention, after receiving the memory access request from the trusted virtual machine, a virtual machine monitor of a mobile terminal queries, in the preset second memory mapping table, the real physical memory having the mapping relationship with the virtual physical memory carried in the memory access request, and completes the memory access request, that is, returns the physical memory to the trusted virtual machine, if finding that the physical memory having the mapping relationship with the virtual physical memory exists, so that the trusted virtual machine can access the physical memory; or indicates an access exception if finding that no physical memory having the mapping relationship with the virtual physical memory exists.

Figure 7:
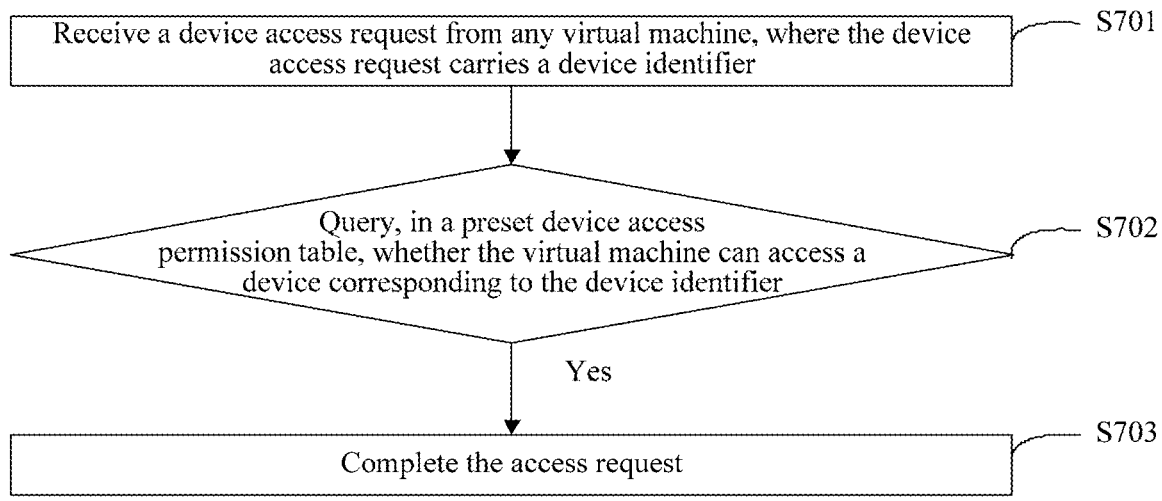
FIG. 7 is a flowchart of a method for accessing a device access permission table in a virtual execution environment according to an embodiment of the present invention.

Referring to FIG. 7, FIG. 7 is a flowchart of a method for accessing a device access permission table in a virtual execution environment according to an embodiment of the present invention. The method includes the following steps.

S701: Receive a device access request from any virtual machine, where the device access request carries a device identifier.

S702: Query, in a preset device access permission table, whether the virtual machine can access a device corresponding to the device identifier; and perform S703 if the virtual machine can access the device corresponding to the device identifier.

S703: Complete the access request.

In this embodiment of the present invention, when receiving the device access request from any virtual machine, a virtual machine monitor of a mobile terminal queries, in the preset device access permission table, whether the virtual machine can access the device; and allows access of the virtual machine to the device if determining that the virtual machine can access the device; otherwise, forbids access of the virtual machine to the device, for example, indicates an access exception.

Figure 8:
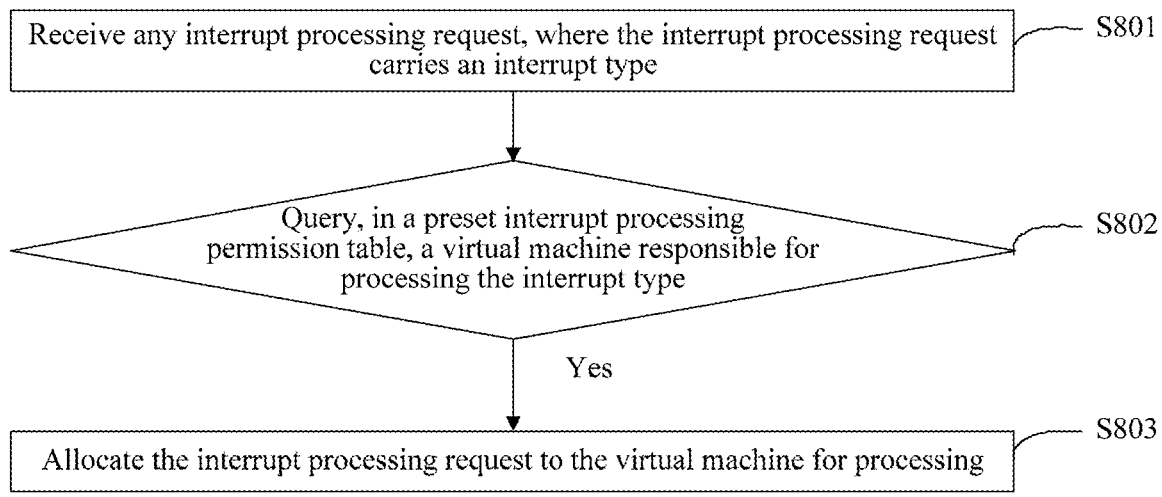
FIG. 8 is a flowchart of a method for accessing an interrupt processing permission table in a virtual execution environment according to an embodiment of the present invention.

Referring to FIG. 8, FIG. 8 is a flowchart of a method for accessing an interrupt processing permission table in a virtual execution environment according to an embodiment of the present invention. The method includes the following steps.

S801: Receive any interrupt processing request, where the interrupt processing request carries an interrupt type.

S802: Query, in a preset interrupt processing permission table, a virtual machine responsible for processing the interrupt type.

S803: Allocate the interrupt processing request to the virtual machine for processing.

In this embodiment of the present invention, after receiving any interrupt processing request, a virtual machine monitor in a mobile terminal queries, in the preset interrupt processing permission table, the virtual machine responsible for processing the interrupt type carried in the interrupt processing request; and allocates the interrupt processing request to the virtual machine for processing.

Figure 9:
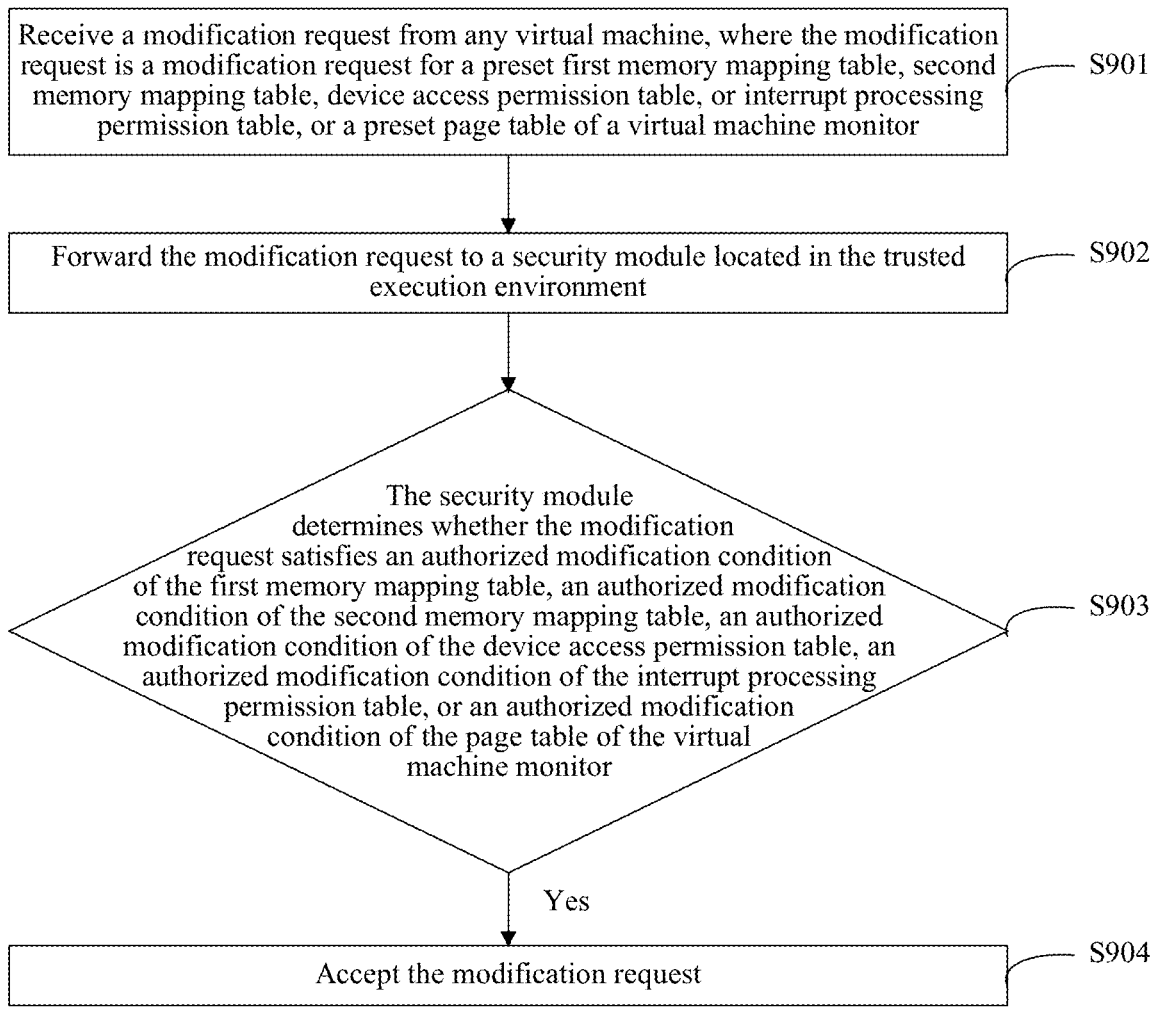
FIG. 9 is a flowchart of a method for modifying a preset first memory mapping table, second memory mapping table, device access permission table, and interrupt processing permission table according to an embodiment of the present invention.

In addition, a security module is provided in a trusted execution environment provided by hardware of the mobile terminal in this embodiment of the present invention. To further ensure data security of a virtual machine user, this embodiment of the present invention provides a method for modifying a preset first memory mapping table, second memory mapping table, device access permission table, and interrupt processing permission table. Referring to FIG. 9, FIG. 9 is a flowchart of a method for modifying a preset first memory mapping table, second memory mapping table, device access permission table, and interrupt processing permission table according to an embodiment of the present invention. The method includes the following steps.

S901: Receive a modification request from any virtual machine, where the modification request is a modification request for a preset first memory mapping table, second memory mapping table, device access permission table, or interrupt processing permission table, or a preset page table of a virtual machine monitor.

S902: Forward the modification request to a security module located in a trusted execution environment.

S903: The security module is configured to determine whether the modification request satisfies an authorized modification condition of the first memory mapping table, an authorized modification condition of the second memory mapping table, an authorized modification condition of the device access permission table, an authorized modification condition of the interrupt processing permission table, or an authorized modification condition of the page table of the virtual machine monitor, and performs S904 when determining that the modification request satisfies any authorized modification condition.

The authorized modification condition includes that the virtual machine sending the modification request is a trusted virtual machine.

S904: Accept the modification request.

Because the security module is located in the trusted execution environment provided by hardware of a mobile terminal, through isolation provided by the hardware, the security module in this embodiment of the present invention can be prevented from being damaged by a malicious program. In addition, the authorized modification condition of the first memory mapping table, the second memory mapping table, the device access permission table, the interrupt processing permission table, or the page table of the virtual machine monitor is stored into the security module. Once the modification request for the first memory mapping table, the second memory mapping table, the device access permission table, the interrupt processing permission table, or the page table of the virtual machine monitor exists, the security module is configured to determine, based on the preset authorized modification condition, whether the modification request is valid, and allows modifying the first memory mapping table, the second memory mapping table, the device access permission table, the interrupt processing permission table, or the page table of the virtual machine monitor if the modification request is valid. Therefore, in this embodiment of the present invention, the first memory mapping table, the second memory mapping table, the device access permission table, the interrupt processing permission table, and the page table of the virtual machine monitor can be prevented from being maliciously modified, thereby ensuring the data security of the virtual machine user.

Specifically, each of the authorized modification conditions of the first memory mapping table, the second memory mapping table, the device access permission table, and the interrupt processing permission table is that the virtual machine sending the modification request is a trusted virtual machine, and the modification request of the virtual machine is a modification for the first memory mapping table, the second memory mapping table, the device access permission table, or the interrupt processing permission table. The authorized modification condition of the page table of the virtual machine monitor is that the virtual machine sending the modification request is a trusted virtual machine.

In the virtual execution environment access method provided in this embodiment of the present invention, a trusted virtual machine and an ordinary virtual machine of a user simulate a process of switching an execution environment between a trusted execution environment and an ordinary execution environment provided by the hardware of the mobile terminal, thereby providing the execution environments independent of each other for a security application and an ordinary application of the user, and ensuring security of data information.

In addition, in this embodiment of the present invention, the security module is provided in the trusted execution environment provided by the hardware of the mobile terminal, to further ensure the data security of the user. The security module is configured to determine validity of the modification request, to prevent an unauthorized modification on the data information of the user by a malicious program, thereby ensuring the data security of the user.

Figure 10:
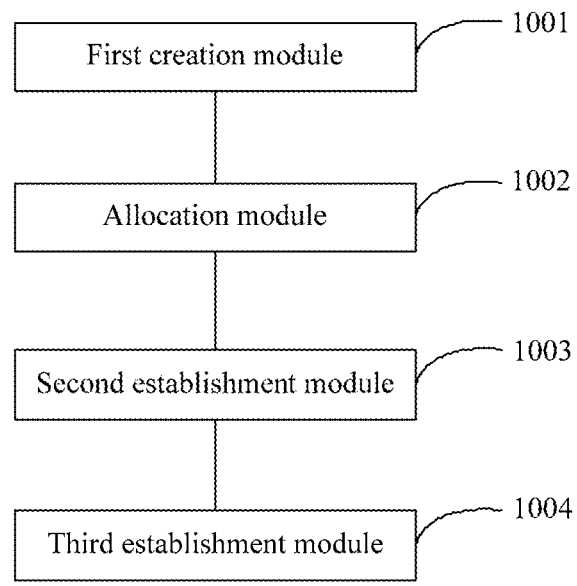
FIG. 10 is a schematic structural diagram of an execution environment virtualization apparatus according to an embodiment of the present invention.

An embodiment of the present invention further provides an execution environment virtualization apparatus. Referring to FIG. 10, FIG. 10 is a schematic structural diagram of the execution environment virtualization apparatus according to this embodiment of the present invention. The apparatus is applied to a mobile terminal, and the mobile terminal has an ordinary execution environment and a trusted execution environment provided by hardware. The apparatus includes:

a first creation module 1001, configured to create an ordinary virtual machine and a trusted virtual machine for a user in the ordinary execution environment, where the ordinary virtual machine executes an ordinary application of the user, and the trusted virtual machine executes a security application of the user;

an allocation module 1002, configured to allocate virtual physical memories having a same size to the ordinary virtual machine and the trusted virtual machine, where the virtual physical memory of the ordinary virtual machine includes an ordinary memory and a secure memory, the virtual physical memory of the trusted virtual machine includes an ordinary memory and a secure memory, and the ordinary memory of the ordinary virtual machine and the ordinary memory of the trusted virtual machine have a same size;

a second establishment module 1003, configured to: establish a mapping relationship between the ordinary memory of the ordinary virtual machine and a physical memory, and store the mapping relationship between the ordinary memory of the ordinary virtual machine and the physical memory in a first memory mapping table, so that the ordinary virtual machine accesses the ordinary memory of the ordinary virtual machine based on the first memory mapping table; and a third establishment module 1004, configured to: establish a mapping relationship between the virtual physical memory of the trusted virtual machine and a physical memory, and store the mapping relationship between the virtual physical memory of the trusted virtual machine and the physical memory in a second memory mapping table, so that the trusted virtual machine accesses the secure memory and the ordinary memory of the trusted virtual machine based on the second memory mapping table, where the physical memory mapped to the ordinary memory of the trusted virtual machine is the same as the physical memory mapped to the ordinary memory of the ordinary virtual machine.

In addition, the apparatus further includes:
a fourth creation module, configured to create and maintain a device access permission table and an interrupt processing permission table for the user, where the device access permission table stores devices that can be accessed by the ordinary virtual machine and the trusted virtual machine of the user, and the interrupt processing permission table stores interrupt types that the ordinary virtual machine and the trusted virtual machine of the user are responsible for processing.

To further ensure security of data information of the user, the apparatus further includes:
a storage module, configured to store an authorized modification condition of the first memory mapping table, an authorized modification condition of the second memory mapping table, an authorized modification condition of the device access permission table, an authorized modification condition of the interrupt processing permission table, and an authorized modification condition of a page table of a virtual machine monitor into a security module, where the security module is located in the trusted execution environment, and the trusted virtual machine can operate the security module.

The execution environment virtualization apparatus provided in this embodiment of the present invention uses the trusted virtual machine and the ordinary virtual machine to simulate the trusted execution environment and the ordinary execution environment provided by the hardware of the mobile terminal, thereby providing isolated execution environments for a security application and an ordinary application of a virtual machine user, and ensuring data security of the security application.

Figure 11:
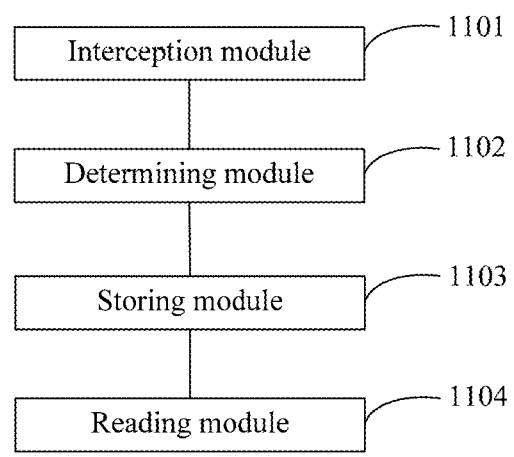
FIG. 11 is a schematic structural diagram of a virtual execution environment access apparatus according to an embodiment of the present invention.

An embodiment of the present invention further provides a virtual execution environment access apparatus. Referring to FIG. 11, FIG. 11 is a schematic structural diagram of the virtual execution environment access apparatus according to this embodiment of the present invention. The apparatus includes:

an interception module 1101, configured to intercept an environment switching instruction executed by the user in the ordinary virtual machine or the trusted virtual machine;

a determining module 1102, configured to determine, based on the environment switching instruction, a target virtual machine that the user is to switch to;

a storing module 1103, configured to store execution status information of a virtual machine currently used by the user; and a reading module 1104, configured to read and restore execution status information of the target virtual machine.

In an actual application, the apparatus further includes:

a first receiving module, configured to receive a memory access request from the ordinary virtual machine, where the memory access request carries a virtual physical memory; and a first query module, configured to: query, in a preset first memory mapping table, a real physical memory having a mapping relationship with the virtual physical memory; and complete the memory access request if the real physical memory is found.

In an actual application, the apparatus further includes:

a second receiving module, configured to receive a memory access request from the trusted virtual machine, where the memory access request carries a virtual physical memory; and a second query module, configured to: query, in a preset second memory mapping table, a real physical memory having a mapping relationship with the virtual physical memory; and complete the memory access request if the real physical memory is found.

In an actual application, the apparatus further includes:

a third receiving module, configured to receive an access request from any virtual machine, where the access request carries a device identifier; and a third query module, configured to: query, in a preset device access permission table, whether the virtual machine can access a device corresponding to the device identifier; and complete the access request if the virtual machine can access the device corresponding to the device identifier.

In an actual application, the apparatus further includes:

a fourth receiving module, configured to receive any interrupt processing request, where the interrupt processing request carries an interrupt type; and a fourth query module, configured to: query, in a preset interrupt processing permission table, a virtual machine responsible for processing the interrupt type; and allocate the interrupt processing request to the virtual machine for processing.

To further ensure security of data information of the user, the apparatus further includes:

a fifth receiving module, configured to receive a modification request from any virtual machine, where the modification request is a modification request for the preset first memory mapping table, second memory mapping table, device access permission table, or interrupt processing permission table, or a preset page table of a virtual machine monitor; and a forwarding module, configured to forward the modification request to a security module located in the trusted execution environment, where the security module is configured to determine whether the modification request satisfies an authorized modification condition of the first memory mapping table, an authorized modification condition of the second memory mapping table, an authorized modification condition of the device access permission table, an authorized modification condition of the interrupt processing permission table, or an authorized modification condition of the page table of the virtual machine monitor, and accepts the modification request when determining that the modification request satisfies any authorized modification condition, and the authorized modification condition includes that the virtual machine sending the modification request is a trusted virtual machine.

The virtual execution environment access apparatus provided in this embodiment of the present invention simulates, for the trusted virtual machine and the ordinary virtual machine of the user, a process of switching the execution environments between the trusted execution environment and an ordinary execution environment provided by the hardware of the mobile terminal, thereby providing the execution environments independent of each other for the security application and the ordinary application of the user, and ensuring security of data information. In addition, the security module provided in the trusted execution environment determines validity of the modification request, to prevent an unauthorized modification on the data information of the user by a malicious program, thereby ensuring the data security of the user.

Figure 12:
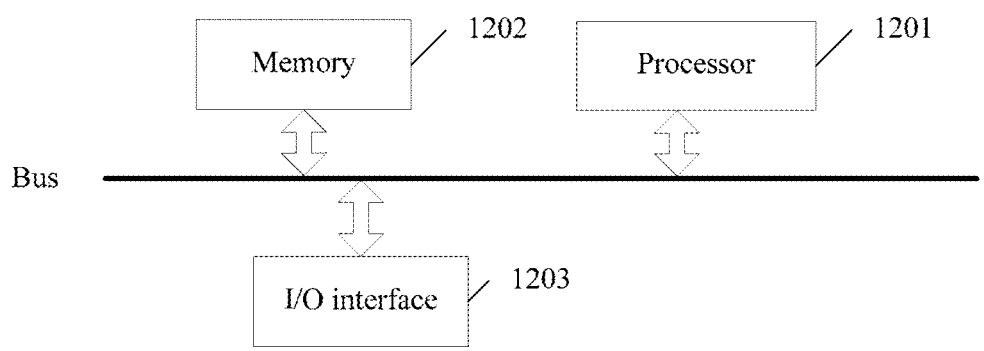
FIG. 12 is a schematic diagram of a hardware structure of an execution environment virtualization apparatus according to an embodiment of the present invention.

FIG. 12 is a schematic structural diagram of an execution environment virtualization apparatus according to an embodiment of the present invention. The apparatus is applied to a mobile terminal. The mobile terminal has an ordinary execution environment provided by hardware. As shown in FIG. 12, the apparatus includes a processor 1201 and a memory 1202, and further includes an I/O interface 1203. The processor and the memory are connected by using a bus. The memory stores program code and transmits the program code to the processor. The processor performs the following steps based on an instruction in the program code:

creating an ordinary virtual machine and a trusted virtual machine for a user in the ordinary execution environment, where the ordinary virtual machine executes an ordinary application of the user, and the trusted virtual machine executes a security application of the user; allocating virtual physical memories having a same size to the ordinary virtual machine and the trusted virtual machine, where the virtual physical memory of the ordinary virtual machine includes an ordinary memory and a secure memory, the virtual physical memory of the trusted virtual machine includes an ordinary memory and a secure memory, and the ordinary memory of the ordinary virtual machine and the ordinary memory of the trusted virtual machine have a same size; establishing a mapping relationship between the ordinary memory of the ordinary virtual machine and a physical memory, and storing the mapping relationship between the ordinary memory of the ordinary virtual machine and the physical memory in a first memory mapping table, so that the ordinary virtual machine accesses the ordinary memory of the ordinary virtual machine based on the first memory mapping table; and establishing a mapping relationship between the virtual physical memory of the trusted virtual machine and a physical memory, and storing the mapping relationship between the virtual physical memory of the trusted virtual machine and the physical memory in a second memory mapping table, so that the trusted virtual machine accesses the secure memory and the ordinary memory of the trusted virtual machine based on the second memory mapping table, where the physical memory mapped to the ordinary memory of the trusted virtual machine is the same as the physical memory mapped to the ordinary memory of the ordinary virtual machine.

Optionally, the processor is further configured to create and maintain a device access permission table and an interrupt processing permission table for the user. The device access permission table stores devices that can be accessed by the ordinary virtual machine and the trusted virtual machine of the user, and the interrupt processing permission table stores interrupt types that the ordinary virtual machine and the trusted virtual machine of the user are responsible for processing.

Optionally, the mobile terminal has a trusted execution environment provided by the hardware. The processor is further configured to store an authorized modification condition of the first memory mapping table, an authorized modification condition of the second memory mapping table, an authorized modification condition of the device access permission table, an authorized modification condition of the interrupt processing permission table, and an authorized modification condition of a page table of a virtual machine monitor into a security module, where the security module is located in the trusted execution environment, and the trusted virtual machine can operate the security module.

Figure 13:
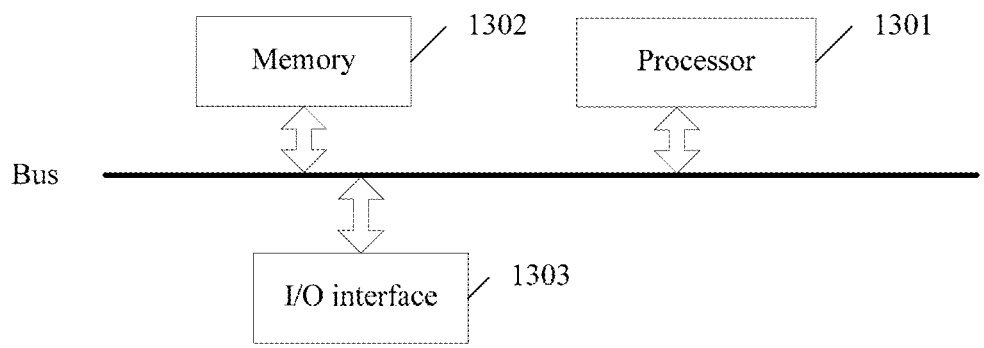
FIG. 13 is a schematic diagram of a hardware structure of a virtual execution environment access apparatus according to an embodiment of the present invention.

FIG. 13 is a schematic structural diagram of a virtual execution environment access apparatus according to an embodiment of the present invention. The apparatus is applied to a mobile terminal. The mobile terminal has an ordinary execution environment provided by hardware. Two virtual machines, an ordinary virtual machine and a trusted virtual machine, associated with a preset user run in the ordinary execution environment. The ordinary virtual machine executes an ordinary application of the user, and the trusted virtual machine executes a security application of the user. As shown in FIG. 13, the apparatus includes a processor 1301 and a memory 1302, and further includes an I/O interface 1303. The processor and the memory are connected by using a bus. The memory stores program code and transmits the program code to the processor. The processor performs the following steps based on an instruction in the program code:

intercepting an environment switching instruction executed by the user in the ordinary virtual machine or the trusted virtual machine; determining, based on the environment switching instruction, a target virtual machine that the user is to switch to; storing execution status information of a virtual machine currently used by the user; and reading and restoring execution status information of the target virtual machine.

Optionally, the processor is further configured to: receive a memory access request from the ordinary virtual machine, where the memory access request carries a virtual physical memory; query, in a preset first memory mapping table, a real physical memory having a mapping relationship with the virtual physical memory; and complete the memory access request if the real physical memory is found.

The processor is further configured to: receive a memory access request from the trusted virtual machine, where the memory access request carries a virtual physical memory; query, in a preset second memory mapping table, a real physical memory having a mapping relationship with the virtual physical memory; and complete the memory access request if the real physical memory is found.

The processor is further configured to: receive a device access request from any virtual machine, where the device access request carries a device identifier; query, in a preset device access permission table, whether the virtual machine can access a device corresponding to the device identifier; and complete the device access request if determining that the virtual machine can access the device corresponding to the device identifier.

The processor is further configured to: receive any interrupt processing request, where the interrupt processing request carries an interrupt type; query, in a preset interrupt processing permission table, a virtual machine responsible for processing the interrupt type; and allocate the interrupt processing request to the virtual machine for processing.

Optionally, the mobile terminal has a trusted execution environment provided by the hardware. The processor is further configured to: receive a modification request from any virtual machine, where the modification request is a modification request for the preset first memory mapping table, second memory mapping table, device access permission table, or interrupt processing permission table, or a preset page table of a virtual machine monitor; and forward the modification request to a security module located in the trusted execution environment, where the security module is configured to determine whether the modification request satisfies an authorized modification condition of the first memory mapping table, an authorized modification condition of the second memory mapping table, an authorized modification condition of the device access permission table, an authorized modification condition of the interrupt processing permission table, or an authorized modification condition of the page table of the virtual machine monitor, and accepts the modification request when determining that the modification request satisfies any authorized modification condition, and the authorized modification condition includes that the virtual machine sending the modification request is a trusted virtual machine.

For technical principles and technical effects of the execution environment virtualization apparatus and the virtual execution environment access apparatus in the embodiments of the present invention, refer to the related descriptions in the embodiments shown in FIG. 1 to FIG. 11, and details are not described again. It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to real is to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions in the embodiments of the present invention.

What is claimed is:

1. An execution environment virtualization method, wherein the method is applied to a mobile terminal, the mobile terminal has an ordinary execution environment provided by hardware, and the method comprises:
    creating an ordinary virtual machine and a trusted virtual machine for a user in the ordinary execution environment;
    allocating virtual physical memories having a same size to the ordinary virtual machine and the trusted virtual machine, wherein the virtual physical memory of the ordinary virtual machine comprises an ordinary memory and a secure memory, the virtual physical memory of the trusted virtual machine comprises an ordinary memory and a secure memory, and the ordinary memory of the ordinary virtual machine and the ordinary memory of the trusted virtual machine have a same size;
    establishing a mapping relationship between the ordinary memory of the ordinary virtual machine and a physical memory, and storing the mapping relationship between the ordinary memory of the ordinary virtual machine and the physical memory in a first memory mapping table;
    establishing a mapping relationship between the ordinary memory of the trusted virtual machine and the physical memory mapped to the ordinary memory of the ordinary virtual machine; and
    storing the mapping relationship between the ordinary memory of the trusted virtual machine and the physical memory in a second memory mapping table,
    wherein physical memory blocks mapped to the ordinary memory of the trusted virtual machine are also mapped to the ordinary memory of the ordinary virtual machine.

2. The method according to claim 1, wherein the method further comprises:
    creating and maintaining a device access permission table and an interrupt processing permission table for the user, wherein the device access permission table stores device identifiers corresponding to devices accessible by the ordinary virtual machine and the trusted virtual machine of the user, and the interrupt processing permission table stores interrupt types that the ordinary virtual machine and the trusted virtual machine of the user are responsible for processing.

3. The method according to claim 1, wherein the mobile terminal has a trusted execution environment provided by hardware, and the method further comprises:
    storing an authorized modification condition of the first memory mapping table, an authorized modification condition of the second memory mapping table, an authorized modification condition of a device access permission table, an authorized modification condition of an interrupt processing permission table, and an authorized modification condition of a page table of a virtual machine monitor into a security module, wherein the security module is located in the trusted execution environment, and the trusted virtual machine operates the security module.

4. A virtual execution environment access method, wherein the method is applied to a mobile terminal, the mobile terminal having an ordinary execution environment provided by hardware and two virtual machines, one of the two virtual machines being an ordinary virtual machine and the other one of the two virtual machines being a trusted virtual machine, and the two virtual machines being associated with a preset user run in the ordinary execution environment, wherein the method comprises:
    intercepting an environment switching instruction executed by the user in the ordinary virtual machine or the trusted virtual machine;
    determining, based on the environment switching instruction, a target virtual machine that the user is to switch to; and
    storing execution status information of a virtual machine currently used by the user, and reading and restoring execution status information of the target virtual machine, wherein virtual physical memories having a same size are allocated to the ordinary virtual machine and the trusted virtual machine, wherein the virtual physical memory of the ordinary virtual machine comprises an ordinary memory and a secure memory, the virtual physical memory of the trusted virtual machine comprises an ordinary memory and a secure memory, and the ordinary memory of the ordinary virtual machine and the ordinary memory of the trusted virtual machine have a same size, and a mapping relationship between the ordinary memory of the trusted virtual machine and a physical memory mapped to the ordinary memory of the ordinary virtual machine is established and stored in a preset second memory mapping table, wherein physical memory blocks mapped to the ordinary memory of the trusted virtual machine are also mapped to the ordinary memory of the ordinary virtual machine.

5. The method according to claim 4, wherein the method further comprises:
    receiving a memory access request from the ordinary virtual machine, wherein the memory access request carries an address of a virtual physical memory; and
    querying, in a preset first memory mapping table, a physical memory having a mapping relationship with the virtual physical memory associated with the address; and
    completing the memory access request if the queried physical memory is found.

6. The method according to claim 5, wherein the mobile terminal has a trusted execution environment provided by hardware, and the method further comprises:

receiving a modification request from any virtual machine, wherein the modification request is a modification request for the preset first memory mapping table, the preset second memory mapping table, a preset device access permission table, or a preset interrupt processing permission table, or a preset page table of a virtual machine monitor; and forwarding the modification request to a security module located in the trusted execution environment, wherein the security module is configured to:

determine whether the modification request satisfies an authorized modification condition of the preset first memory mapping table, an authorized modification condition of the preset second memory mapping table, an authorized modification condition of the preset device access permission table, an authorized modification condition of the preset interrupt processing permission table, or an authorized modification condition of the preset page table of the virtual machine monitor, and accept the modification request when determining that the modification request satisfies any authorized modification condition, wherein the satisfied authorized modification condition comprises that the virtual machine sending the modification request is a trusted virtual machine.

7. The method according to claim 4, wherein the method further comprises:

receiving a memory access request from the trusted virtual machine, wherein the memory access request carries an address of the virtual physical memory of the trusted virtual machine; and querying, in the preset second memory mapping table, a real physical memory having a mapping relationship with the virtual physical memory of the trusted virtual machine; and completing the memory access request if the real physical memory is found.

8. The method according to claim 4, wherein the method further comprises:

receiving a device access request from any virtual machine, wherein the device access request carries a device identifier; and querying, in a preset device access permission table, whether the virtual machine, from which the device access request is received, accesses a device corresponding to the device identifier; and completing the device access request if the virtual machine, from which the device access request is received, accesses the device corresponding to the device identifier.

9. The method according to claim 4, wherein the method further comprises:

receiving any interrupt processing request, wherein the interrupt processing request carries an interrupt type;

querying, in a preset interrupt processing permission table, a virtual machine responsible for processing the interrupt type; and allocating the interrupt processing request to the responsible virtual machine for processing.

10. An execution environment virtualization apparatus, wherein the execution environment virtualization apparatus is applied to a mobile terminal, the mobile terminal has an ordinary execution environment provided by hardware, and the apparatus comprising:

at least one processor; and a non-transitory computer-readable storage medium coupled to the at least one processor and storing programming instructions for execution by the at least one processor, the programming instructions instruct the at least one processor to perform following operations:

creating an ordinary virtual machine and a trusted virtual machine for a user in the ordinary execution environment;

allocating virtual physical memories having a same size to the ordinary virtual machine and the trusted virtual machine, wherein the virtual physical memory of the ordinary virtual machine comprises an ordinary memory and a secure memory, the virtual physical memory of the trusted virtual machine comprises an ordinary memory and a secure memory, and the ordinary memory of the ordinary virtual machine and the ordinary memory of the trusted virtual machine have a same size;

establishing a mapping relationship between the ordinary memory of the ordinary virtual machine and a physical memory, and store the mapping relationship between the ordinary memory of the ordinary virtual machine and the physical memory in a first memory mapping table;

establishing a mapping relationship between the ordinary memory of the trusted virtual machine and the physical memory mapped to the ordinary memory of the ordinary virtual machine; and storing the mapping relationship between the ordinary memory of the trusted virtual machine and the physical memory in a second memory mapping table wherein physical memory blocks mapped to the ordinary memory of the trusted virtual machine are also mapped to the ordinary memory of the ordinary virtual machine.

11. The apparatus according to claim 10, wherein the programming instructions further instruct the at least one processor to perform following operation steps:

creating and maintain a device access permission table and an interrupt processing permission table for the user, wherein the device access permission table stores device identifiers corresponding to devices accessible by the ordinary virtual machine and the trusted virtual machine of the user, and the interrupt processing permission table stores interrupt types that the ordinary virtual machine and the trusted virtual machine of the user are responsible for processing.

12. The apparatus according to claim 10, wherein the mobile terminal has a trusted execution environment provided by hardware, and the apparatus further comprises:

a storage, configured to store an authorized modification condition of the first memory mapping table, an authorized modification condition of the second memory mapping table, an authorized modification condition of a device access permission table, an authorized modification condition of an interrupt processing permission table, and an authorized modification condition of a page table of a virtual machine monitor into a security module, wherein the security module is located in the trusted execution environment, and the trusted virtual machine operates the security module.

13. A virtual execution environment access apparatus, wherein the apparatus is applied to a mobile terminal, the mobile terminal having an ordinary execution environment provided by hardware and two virtual machines, one of the two virtual machines being an ordinary virtual machine and the other one of the two virtual machines being a trusted virtual machine, and the two virtual machines being associated with a preset user run in the ordinary execution environment, wherein the apparatus comprises:

at least one processor; and a non-transitory computer-readable storage medium coupled to the at least one processor and storing programming instructions for execution by the at least one processor, the programming instructions instruct the at least one processor to perform:

intercepting an environment switching instruction executed by the user in the ordinary virtual machine or the trusted virtual machine;

determining based on the environment switching instruction, a target virtual machine that the user is to switch to;

storing an execution status information of a virtual machine currently used by the user; and reading and restoring execution status information of the target virtual machine, wherein virtual physical memories having a same size are allocated to the ordinary virtual machine and the trusted virtual machine, wherein the virtual physical memory of the ordinary virtual machine comprises an ordinary memory and a secure memory, the virtual physical memory of the trusted virtual machine comprises an ordinary memory and a secure memory, and the ordinary memory of the ordinary virtual machine and the ordinary memory of the trusted virtual machine have a same size, and a mapping relationship between the ordinary memory of the trusted virtual machine and a physical memory mapped to the ordinary memory of the ordinary virtual machine is established and stored in a preset second memory mapping table, wherein physical memory blocks mapped to the ordinary memory of the trusted virtual machine are also mapped to the ordinary memory of the ordinary virtual machine.

14. The apparatus according to claim 13, wherein the programming instructions further instruct the at least one processor to perform following operations:

receiving a memory access request from the ordinary virtual machine, wherein the memory access request carries an address of a virtual physical memory; and querying, in a preset first memory mapping table, a real physical memory having a mapping relationship with the virtual physical memory associated with the address; and completing the memory access request if the real physical memory is found.

15. The apparatus according to claim 14, wherein the mobile terminal has a trusted execution environment provided by hardware, and the programming instructions further instruct the at least one processor to perform following operations:

receiving a modification request from any virtual machine, wherein the modification request is a modification request for the preset first memory mapping table, the preset second memory mapping table, a preset device access permission table, or a preset interrupt processing permission table, or a preset page table of a virtual machine monitor; and forwarding the modification request to a security module located in the trusted execution environment, wherein the security module is configured to determine whether the modification request satisfies an authorized modification condition of the preset first memory mapping table, an authorized modification condition of the preset second memory mapping table, an authorized modification condition of the preset device access permission table, an authorized modification condition of the preset interrupt processing permission table, or an authorized modification condition of the preset page table of the virtual machine monitor, and accept the modification request when determining that the modification request satisfies any authorized modification condition, wherein the satisfied authorized modification condition comprises that the virtual machine sending the modification request is a trusted virtual machine.

16. The apparatus according to claim 13, wherein the programming instructions further instruct the at least one processor to perform following operations:

receiving a memory access request from the trusted virtual machine, wherein the memory access request carries an address of a virtual physical memory; and querying, in the preset second memory mapping table, a real physical memory having a mapping relationship with the virtual physical memory associated with the address; and completing the memory access request if the real physical memory is found.

17. The apparatus according to claim 13, wherein the programming instructions further instruct the at least one processor to perform following:

receiving a device access request from any virtual machine, wherein the device access request carries a device identifier; and querying, in a preset device access permission table, whether the virtual machine, from which the device access request is received, accesses a device corresponding to the device identifier; and complete the device access request if the virtual machine, from which the device access request is received, accesses the device corresponding to the device identifier.

18. The apparatus according to claim 13, wherein the programming instructions further instruct the at least one processor to perform following operations:

receiving any interrupt processing request, wherein the interrupt processing request carries an interrupt type;

querying, in a preset interrupt processing permission table, a virtual machine responsible for processing the interrupt type; and allocating the interrupt processing request to the responsible virtual machine for processing.

19. A non-transitory computer readable storage medium, wherein the computer readable storage medium includes instructions, when at least one processor of a computing device executes the instructions, the computing device performs:

creating an ordinary virtual machine and a trusted virtual machine for a user in an ordinary execution environment;

allocating virtual physical memories having a same size to the ordinary virtual machine and the trusted virtual machine, wherein the virtual physical memory of the ordinary virtual machine comprises an ordinary memory and a secure memory, the virtual physical memory of the trusted virtual machine comprises an ordinary memory and a secure memory, and the ordinary memory of the ordinary virtual machine and the ordinary memory of the trusted virtual machine have a same size;

establishing a mapping relationship between the ordinary memory of the ordinary virtual machine and a physical memory, and storing the mapping relationship between the ordinary memory of the ordinary virtual machine and the physical memory in a first memory mapping table;

establishing a mapping relationship between the ordinary memory of the trusted virtual machine and the physical memory mapped to the ordinary memory of the ordinary virtual machine; and storing the mapping relationship between the ordinary memory of the trusted virtual machine and the physical memory in a second memory mapping table, wherein physical memory blocks mapped to the ordinary memory of the trusted virtual machine are also mapped to the ordinary memory of the ordinary virtual machine.

* * * * *

UNITED STATES PATENT AND TRADEMARK OFFICE
CERTIFICATE OF CORRECTION

PATENT NO.         : 11,321,452 B2
APPLICATION NO.    : 16/043124
DATED              : May 3, 2022
INVENTOR(S)        : Zhichao Hua et al.

It is certified that error appears in the above-identified patent and that said Letters Patent is hereby corrected as shown below:

On the Title Page

Item (56), "References Cited U.S. PATENT DOCUMENTS", replace "8,397,305 B2 Tormasov" with "8,397,306 B2 Tormasov".

Signed and Sealed this
Thirty-first Day of May, 2022

Katherine Kelly Vidal
*Director of the United States Patent and Trademark Office*